United States Patent
Matsuzawa

(10) Patent No.: US 9,010,933 B2
(45) Date of Patent: Apr. 21, 2015

(54) SILICONE CONTACT LENS AND METHOD FOR MANUFACTURING THEREOF

(71) Applicant: Yasuo Matsuzawa, Roswell, GA (US)

(72) Inventor: Yasuo Matsuzawa, Roswell, GA (US)

(73) Assignee: Shin-Etsu Silicones of America, Inc., Akron, OH (US)

( * ) Notice: Subject to any disclaimer, the term of this patent is extended or adjusted under 35 U.S.C. 154(b) by 35 days.

(21) Appl. No.: 13/765,019

(22) Filed: Feb. 12, 2013

(65) Prior Publication Data

US 2014/0226124 A1    Aug. 14, 2014

(51) Int. Cl.
*G02C 7/04*    (2006.01)
*G02B 1/04*    (2006.01)

(52) U.S. Cl.
CPC ..................... *G02B 1/043* (2013.01)

(58) Field of Classification Search
USPC ........................ 351/159.57, 159.62
See application file for complete search history.

(56) References Cited

U.S. PATENT DOCUMENTS

| | | |
|---|---|---|
| 3,916,033 A | 10/1975 | Merrill |
| 3,996,187 A | 12/1976 | Travnicek |
| 3,996,189 A | 12/1976 | Travnicek |
| 4,332,922 A * | 6/1982 | Kossmehl et al. ............ 525/478 |
| 4,632,844 A * | 12/1986 | Yanagihara et al. .......... 427/488 |
| 5,760,100 A | 6/1998 | Nicolson et al. |
| 6,213,604 B1 * | 4/2001 | Valint et al. ............... 351/159.33 |
| 2009/0212450 A1 * | 8/2009 | Imafuku ...................... 264/1.36 |

FOREIGN PATENT DOCUMENTS

| | | |
|---|---|---|
| JP | 51-27546 A | 3/1976 |
| JP | 51-131562 A | 11/1976 |
| JP | 54-081363 A | 6/1979 |
| JP | 2003-248200 A | 9/2003 |
| JP | 2007-070405 A | 3/2007 |
| JP | 2009-533081 A | 9/2009 |
| WO | 03/060572 A | 7/2003 |
| WO | 2007/117214 A | 10/2007 |

* cited by examiner

*Primary Examiner* — Jordan Schwartz
(74) *Attorney, Agent, or Firm* — Pearne & Gordon LLP

(57) ABSTRACT

A contact lens and a method for manufacturing thereof are provided. The contact lens has a silicone contact lens base material and an amorphous carbon film formed in the silicone contact lens base material. The amorphous carbon film of the contact lens is formed by subjecting the silicone contact lens base material to a plasma polymerization under an atmosphere of a mixed gas comprising a hydrocarbon gas and an oxygen-containing gas. The contact lens has excellent oxygen permeability and a high refractive index.

18 Claims, No Drawings

SILICONE CONTACT LENS AND METHOD FOR MANUFACTURING THEREOF

BACKGROUND OF THE INVENTION

1. Technical Field

The present invention relates generally to a contact lens and a method for manufacturing thereof. In particular, the invention relates to a contact lens having excellent oxygen permeability and a high refractive index and a method for manufacturing thereof.

2. Background Art

Recently, a growing number of people wear a contact lens, especially a soft contact lens. Since a contact lens is used directly in contact with the ocular mucous membrane, it needs to be maintained as clean as possible. Thus, it is also important to reduce the attachment of foreign matters such as bacteria and the like to the lens during wearing it. Although many of the conjunctiva bacteria are not pathogenic, once an excessive number of bacteria are attached to a contact lens, a biofilm is formed on the surface of the contact lens due to the extrabacterial materials, etc. secreted from the attached bacterial. The biofilm is in danger of being a breeding ground for pathogenic microorganisms which may increase the risk for bacterial infectious diseases.

Conventionally, an antibiotic-supported contact lens has been reported as a technique for controlling the attachment of bacteria to the contact lens (See, Prior Art Documents 1 and 2). However, such a contact lens is made antibacterial only by using a formulation for a contact lens ocular composition such as an eye drop, an eye wash, a contact lens care agent, etc. A technique for controlling the attachment of bacteria to the surface of a contact lens itself has not yet been researched adequately.

Prior Art Document 1: Japanese Laid-open Patent Publication No. 2003-248200

Prior Art Document 1: Japanese Laid-open Patent Publication No. 2009-533081

A practically developed contact lens is classified into a hard-type contact lens based on a polymethyl methacrylate and a soft-type contact lens based on a poly-2-hydroxyethyl methacrylate. However, because these contact lenses have poor oxygen permeability, they cannot be continuously worn for a long period of time due to the insufficient oxygen supply to the corneal tissue on the surface of the eyeballs. In order to improve the oxygen permeability, the use of a contact lens base material copolymerized or blended with silicone (See, Prior Art Documents 3 and 4) has been proposed, but the material does not supply a sufficient amount of oxygen to the eyeballs. Also, the growth of bacteria is accelerated on a soft contact lens when it is exposed to water. Thus, the development of a material having higher oxygen permeability as well as a resistance to the lens contamination from bacteria has been demanded in the art.

Prior Art Document 3: U.S. Pat. No. 5,760,100

Prior Art Document 4: Japanese Laid-open Patent Publication No. 2007-70405

A contact lens using only a silicone polymer has also been proposed in view of oxygen permeability (See, Prior Art Document 5). A silicone contact lens manufactured from a silicone polymer composition as a base material is satisfactory in flexibility, oxygen permeability and transparency. However, because such a contact lens has poor affinity to the surface of the eyeballs as being hydrophobic and water-repellent which are the properties of the silicone itself, it may irritate the corneal tissue to cause inflammation.

Prior Art Document 5: Japanese Laid-open Patent Publication No. 51-131562

Thus, the surface of a silicone contact lens has been modified by graft polymerizing a hydrophilic compound into the surface of the contact lens film using an ionizing radiation (See, Prior Art Document 6) or by subjecting it to the electrically discharging treatment under vapor-containing atmosphere (See, Prior Art Document 7). However, these methods only modifies the surface of the contact lens temporarily to a level that the affinity of the silicone may be improved and are not directed to the above-described attachment of the bacteria.

Prior Art Document 6: Japanese Laid-open Patent Publication No. 51-27546

Prior Art Document 7: Japanese Laid-open Patent Publication No. 54-81363

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a silicone contact lens is provided. The silicone contact lens comprises a silicone contact lens base material and an amorphous carbon film formed in the silicone contact lens base material. In one embodiment, the amorphous carbon film is formed by subjecting the silicone contact lens base material to a plasma polymerization under an atmosphere of a mixed gas comprising a hydrocarbon gas and an oxygen-containing gas. In another embodiment, the hydrocarbon gas is a methane gas. In another embodiment, the mixed gas further comprises a rare gas. In another embodiment, the silicone contact lens base material comprises an addition hardened-type silicone rubber. In another embodiment, the silicone contact lens base material comprises a peroxide hardened-type silicone rubber. In another embodiment, the amorphous carbon film has a thickness of 90 to 250 Å. In another embodiment, the amorphous carbon film has a thickness of 100 to 200 Å. In another embodiment, the silicone contact lens base material comprises dimethyl polysiloxane, an organo polysilozane resin, and tetramethyl tetravinyl cyclotetrasiloxane.

In accordance with one aspect of the present invention, a method for manufacturing a silicone contact lens is provided. The silicone contact lens comprises a silicone contact lens base material and an amorphous carbon film formed in the silicone contact lens base material. The method comprises a step of forming amorphous carbon film by subjecting the silicone contact lens base material to a plasma polymerization under an atmosphere of a mixed gas comprising a hydrocarbon gas and an oxygen-containing gas. In one embodiment, the hydrocarbon gas is a methane gas. In another embodiment, the oxygen-containing gas is air or oxygen. In another embodiment, the mixed gas further comprises a rare gas. In another embodiment, the hydrocarbon gas is a methane gas and the oxygen-containing gas is oxygen. In another embodiment, a volume ratio of the methane gas to oxygen is from 50:50 to 70:30. In another embodiment, a volume ratio of the methane gas to oxygen is from 55:45 to 65:35. In another embodiment, a pressure of the mixed gas is 3 to 10 Pa.

It is one object of the present invention to provide a silicone contact lens which comprises a silicone resin having high oxygen permeability and flexibility and an amorphous carbon layer that is formed on its surface and completely covers the lens surface. The silicone contact lens of the present invention is suitably hydrophilic. Accordingly, bacteria do not attach the silicone contact lens.

It is another object of the present invention to provide a method for manufacturing the silicone contact lens.

According to the present invention, it is possible to provide a silicone contact lens which is comfortably suitable for everyday use by providing its smooth surface, a suitable hydrophilicity as well as high oxygen permeability.

Also, since the surface of the silicone contact lens on which the fine amorphous carbon layer is formed can prevent the attached bacteria from growing inside the lens, the lens is excellent in view of sanitation.

DETAILED DESCRIPTION OF AN EMBODIMENT OF THE INVENTION

The silicone contact lens of the present invention is formed by subjecting a silicone rubber, which is obtained by curing an addition hardened-type silicone rubber or a peroxide hardened-type silicone rubber, to a plasma polymerization under an atmosphere of a mixed gas comprising a hydrocarbon gas and an oxygen-containing gas to form an amorphous carbon thin film on its surface.

The following illustrate the details of the present invention.
[Method of Preparing Silicone Contact Lens Material]
Components (A)

The component (A) is an organopolysiloxane having at least two alkenyl groups bonded to the silicon atom and represented by the following average unit formula:

$$R_a SiO_{4-a/2}$$

wherein in the formula, a is an integer of 1 to 3, at least two of the Rs are alkenyl groups, and the remaining Rs are substituted or non-substituted hydrocarbon groups having no unsaturated aliphatic group.

The organopolysiloxane may be in any shape as being linear, branched linear, cyclic, network or three dimensional. Also, it may be a homopolymer or a copolymer. Its polymerization degree may be an oligomer to a high polymer of 100-10000 units.

The representative examples of the alkenyl group include vinyl group, allyl group, 1-propenyl group, and isopropenyl group, and preferably vinyl group. At least two alkenyl groups must exist in one molecule of the organopolysiloxane. Its location may be anywhere in the organopolysiloxane. The representative examples of the non-substituted hydrocarbon groups include methyl group, ethyl group, n-propyl group, octyl group, cyclohexyl group, and phenyl group. The representative examples of the substituted hydrocarbon groups include tolyl group, xylyl group, benzyl group, chlorophenyl group, and cyanoethyl group. The preferred R group other than the alkenyl group is methyl group.

(Curing Agent Utilizing Hydrosilylation Reaction)

The curing agent utilizing the hydrosilyation reaction is a combination of an organohydrogen polysiloxane and an addition reaction catalyst.
Components (B)

The component (B) is an organohydrogen polysiloxane having at least two hydrogen atoms bonded to the silicon atom and represented by the following average unit formula:

$$R'_b SiO_{4-b/2}$$

wherein in the formula, b is an integer of 1 to 3, at least two of the R's are hydrogen atoms, and the remaining R's are substituted or non-substituted hydrocarbon groups having no unsaturated aliphatic group.

The organohydrogen polysiloxane may be in any shape as being linear, branched linear, cyclic, network or three dimensional. Also, it may be a homopolymer or a copolymer. Its polymerization degree may be a dimer to a high polymer of 10-1000 units.

The representative examples of the non-substituted hydrocarbon groups include methyl group, ethyl group, n-propyl group, octyl group, cyclohexyl group, and phenyl group. The representative examples of the substituted hydrocarbon groups include tolyl group, xylyl group, benzyl group, chlorophenyl group, and cyanoethyl group. The preferred R' group other than the hydrogen is methyl group.

The blended amount of the component (B) is such an amount that the number of the hydrogen atoms bonded to the silicon atom in the component (B) is in the range of 0.8 to 10, preferably 1 to 5 for one alkenyl group bonded to the silicon atom in the component (A). If the blended amount of the component (B) is such an amount that the number of the hydrogen atoms bonded to the silicon atom in the component (B) is less than 0.8 for one alkenyl group bonded to the silicon atom in the component (A), the resulting composition will not sufficiently be cured. Also, If the blended amount of the component (B) is such an amount that the number of the hydrogen atoms bonded to the silicon atom in the component (B) is more than 10 for one alkenyl group bonded to the silicon atom in the component (A), the resulting silicone rubber will have extremely poor rubber elasticity.

Component (C)

The component (C), which is an addition reaction catalyst, may be any catalyst which accelerates the addition reaction of the alkenyl group in the component (A) with the hydrogen atom bonded to the silicon atom in the component (B). The specific examples of these include platinum group metals and their compounds including platinum, palladium, rhodium, and the like; an alcohol-modified chloroplatinic acid; a coordination compound of chloroplatinic acid with an olefin, vinyl siloxane or an acetylene compound; tetrakis(triphenylphosphine)palladium; and chlorotris(triphenylphosphine)rhodium; and the like, with platinum group compound being especially preferred. Also, a photpactivable platinum complex catalyst having a β-diketone platinum complex or a cyclic diene compound as the ligand may be used. These platinum complexes are disclosed in, for example, U.S. Pat. Nos. 6,376,569, 4,916,169, 6,046,250, 5,145,886, 6,150,546, 4,530,879, and 4,510,094.

The component (C) may be used alone, or two or more components (C) may be used in combination.

The blended amount of the component (C) may be any effective amount as the catalyst, and preferably be in the range of 1 to 500 ppm, more preferably 10 to 100 ppm based on the mass converted into the catalyst metal elements for the total amount of the components (A) and (B). If the amount is within the range, the reaction velocity of the addition reaction will be appropriate and the cured material will have good heat resistance.

In case of curing the silicone contact lens material by the hydrosilyation reaction, methylvinylcyclotetrasiloxane, an acetylene alcohol or a maleic acid derivative may also be added in order to provide good storage stability at room temperature and suitable pot life.

In addition, curing the silicone contact lens material by the hydrosilyation reaction may be conducted by heating the material at a temperature of 60 to 250° C. for about one minute to five hours.

Also, curing the silicone contact lens material by the hydrosilyation reaction using a photoactivable platinum complex catalyst may preferably be conducted by exposing the material to a light having a wavelength of about 200 to about 800 nm. The curing may be conducted by irradiating the light to the material for 10 seconds to thirty minutes. The examples of the suitable light sources include a tungsten halogen lamp, a xenon arc lamp, a mercury-arc lamp, a UV-LED, and the like.

(Peroxide Curing Agents)

The peroxides for the component (D) include benzoyl peroxide, t-butyl perbenzoate, o-methyl benzoyl peroxide, p-methyl benzoyl peroxide, di-t-butyl peroxide, dicumyl peroxide, 1,1-bis(t-butyl peroxy)-3,3,5-trimethyl cyclohexane, 2,5-dimethyl-2,5-di(butyl peroxy)hexane, 2,5-dimethyl-2,5-di(butyl peroxy)hexyne, 1,6-bis(p-tolyl peroxy carbonyloxy) hexane, di(4-methyl benzoyl peroxy)hexamethylene biscarbonate, and the like. A single one of these may be used alone, or two or more of these may be used in combination. The addition amount of the component may be 0.01 to 5 parts by mass, preferably 0.05 to 3 parts by mass for 100 parts by mass of the component (A).

The curing condition for the composition using the peroxide is not specifically limited, but the composition may be cured by heating it at a temperature of 100 to 300° C. for about one minute to five hours.

Other components that may preferably be blended include fine powder silica having a property of reinforcing the composition. The fine powder silica which reinforces the mechanical strength of the cured material includes any known materials such as fumed silica, precipitated silica, pyrogenic silica, quartz powder, diatomaceous earth, and the like. A single one of these may be used alone, or two or more of these may be used in combination. The silica particles generally include those having a specific surface area of 50 $m^2$/g or more, particularly 50 to 500 $m^2$/g measured by the BET method. The fine power silica may be used as it is, or treated with an organic silicon compound such as methyl chlorosilane, dimethylpolysiloxane, hexamethyldisilazane, etc. in order to improve the fluidity of the composition of the present invention.

The silicone contact lens base material is prepared by any kind of conventional techniques (for example, the lathe cut manufacturing method, the spin cast manufacturing method, the cast molding manufacturing method, etc.). Thereafter, for example, in the cast molding manufacturing method, the lens may be released from the mold and subjected to the film forming treatment (the above-described plasma polymerization treatment under the mixed gas atmosphere) to provide a silicone contact lens having an amorphous carbon layer.

[Plasma Polymerization Treatment of Silicone Contact Lens]

According to the present invention, an amorphous carbon layer is formed on the surface of the above-described contact lens base material. The above-described coating film is formed by the plasma polymerization treatment under an atmosphere of a mixed gas of a hydrocarbon gas and an oxygen-containing gas, preferably a mixed gas of methane and oxygen. Specifically, the plasma polymerization treatment under an atmosphere of a mixed gas of methane and oxygen is conducted by placing the contact lens base material into a plasma polymerization device and thereafter purging the device to an attainable pressure less than a predetermined range. In case of placing the contact lens base material into the vacuum device and purging the device, the gas and moisture adsorbed in the contact lens base material to be treated is discharged together with the adsorbed gas on the surface of the device, the occluded gas inside the device and the discharged gas from the sealing material. Accordingly, it is practically and commercially preferable to make the attainable pressure of the device constant in order to reduce the fluctuation of the quality between the treated lots and within the lot. The attainable pressure during the vacuum purging process is preferably 0.50 Pa or less, more preferably 0.20 Pa or less. If it is 0.50 Pa or less, the fluctuation of the quality between the treated lots and within the lot (the fluctuation of the coated film thickness) due to the influence of the adsorbed gas on the surface of the device, the gas adsorbed into the contact lens base material, etc., will be preferably reduced, as discussed above. In order to purge the device to the predetermined range, a vacuum pump which is capable of purging the device to the targeted degree of vacuum may be used. Any types of generally known pumps such as a sealed rotary pump and a dry pump may be used. Also, a measuring instrument for measuring the degree of vacuum inside the device may be any type of vacuum gauge which can measure the predetermined range of the pressure, including for example a diaphragm vacuum gauge, a Pirani vacuum gauge, and the like. Moreover, according to the present invention, it is preferable to load the contact lens base material onto a tray which support the base material in order to treat the surface (the front curved surface and the base curved surface) of the contact lens base material uniformly and efficiently. At this time, it is preferable to support the contact lens base material such that 10% or more of the surface of the contact lens base material are in linear contact with the tray in order to improve the stability of the contact lens base material during the treatment, since the inside of the device is in a near vacuum state. Also, the material of the tray to be used can be any material which is generally used in a vacuum device, for example, stainless.

The mixed ratio of methane to oxygen (methane:oxygen) that can be used in the plasma polymerization treatment is preferably 50:50 to 70:30 by volume. If the amount of oxygen is greater than this ratio, the formation speed of the film which is formed on the lens surface will be undesirably decreased (the increase of the treatment time) and the water wettability after the high pressure steam sterilization which is conducted prior to manufacturing the final product will also be undesirably reduced. Also, if the amount of methane is greater than this ratio, the film which is formed on the surface of the lens is likely to become rigid. The rigid polymer film is not preferred as the film for a soft contact lens because it may be pealed or cracked. The above-described mixed ratio is more preferably 55:45 to 65:35.

A mixed gas of methane and oxygen may be charged into the device, or methane and dry air (the water content of 3 ppm) may separately be charged into the device to form the mixed gas. In the first step, it is preferable to continuously supply the gas into the device to conduct the plasma polymerization treatment while maintaining the pressure inside the device constant by the vacuum pump. The flow rate of the mixed gas of methane and oxygen charged into the device is preferably 1.5 to 20 sccm, more preferably 2 to 10 sccm, for example, in case where the inner volume of the device is about 150 to 700 L.

It is preferable to conduct the plasma polymerization treatment after the gas is charged into the device and the pressure inside the device is stabilized. The treatment conditions during the electrostatic discharge are suitably selected, and for example, it is preferable that the pressure inside the device is 3 to 10 Pa, the discharge output is 10 to 80 W and the electric source for generating the plasma has a low frequency of about 6 to 15 kHz. Also, the device may be of an inner electrode type, an outer electrode type, and the like, but any known device can be used for carrying out the treatment. The plasma polymerization treatment time in the first step may be set in consideration of the desired thickness, and may be, for example, 3 to 20 minutes, preferably 4 to 10 minutes.

According to the above steps, an amorphous carbon layer can be formed on the surface of the contact lens base material. It is preferable that the coated film is formed on the entire surface of the base material. The thickness of the coated film is critical in the water wettability and the endurance of the lens surface. The thickness of the film can be measured by using an automatic ellipsometer. Instead of directly measuring the thickness of the coated film formed on the contact lens base material by using the automatic ellipsometer, a lens and a silicon wafer are mounted in any area on the conveyor tray, and the thickness of the film formed on the silicon wafer is measured, and the measured film thickness can be regarded as the thickness of the coated film formed on the contact lens base material. The thickness of the coated film is preferably 90 to 250 Å, more preferably 100 to 200 Å. If the thickness of the coated film is 90 Å or more, the coated film will have high heat resistance, the water wettability of the coated film will not be reduced after the high pressure steam sterilization, and the coated film having a fine amorphous structure will preferably be maintained. Also, if the thickness of the coated film is 250 Å or less, the resulting contact lens will have high oxygen permeability.

[Method for Manufacturing Contact Lens]

The contact lens of the present invention is manufactured by washing the silicone contact lens material prepared according to the above-described process to remove the impurities. Since the contact lens manufactured according to the method of the present invention can be used without any water swelling after molding the lens, it is possible to prevent or reduce the formed amorphous carbon layer from generating cracks, etc.

The above-described silicone contact lens may be subjected to a sterilization treatment with, for example, a high pressure steam. Also, the above-described contact lens may be subjected to an extraction treatment with an organic solvent. The extraction treatment may be conducted by any known technique. With this treatment, it is possible to remove the non-networked silicone, which remains inside the contact lens and is not desirable to a living organism, and other impurities, and the like.

Since the contact lens material manufactured in accordance with the present invention has a fine amorphous carbon layer on its surface, it is possible to prevent bacteria from generating thereon.

The following illustrate the components of the silicone elastomers used in the examples and the comparative examples. Although the present invention is further illustrated by these examples and the comparative examples, the present invention are not limited to the following experiments.

<Preparation of Composition A>

The composition A was prepared by mixing 80 parts by mass of dimethyl polysiloxane having vinyl dimethyl siloxy groups occupied on the both ends of the molecular chain and a viscosity at 25° C. of about 5,000 mPa·s, 20 parts by mass of an organo polysilozane resin having 39.5 mole % of $(CH_3)_3SiO_{1/2}$ units, 6.5 mole % of $(CH_3)_2(CH_2=CH)SiO_{1/2}$ units and 54 mole % of $SiO_2$ units, 0.3 parts by mass of tetramethyltetravinylcyclotetrasiloxane, 0.15 parts by mass of a dimethyl polysiloxane solution containing 1 mass % of a chloroplatinic acid/1,3-divinyltetramethyldisiloxane complex as the platinum atom content and 4.7 parts by mass of an organopolysiloxane resin having 59 mole % of $(CH_3)_2HSiO_{1/2}$ units and 41 mole % of $SiO_2$ units. The composition A was cured at 150° C. for 30 minutes. The cured composition had a hardness of 57 (Type-A 57).

<Preparation of Composition B>

The composition B was prepared by mixing 60 parts by mass of dimethyl polysiloxane having vinyl dimethyl siloxy groups occupied on the both ends of the molecular chain and a viscosity at 25° C. of about 5,000 mPa·s, 15 parts by mass of dimethyl polysiloxane having vinyl dimethyl siloxy groups occupied on the both ends of the molecular chain and a viscosity at 25° C. of about 1,000 mPa·s, 25 parts by mass of an organo polysilozane resin having 39.5 mole % of $(CH_3)_3SiO_{1/2}$ units, 6.5 mole % of $(CH_3)_2(CH_2=CH)SiO_{1/2}$ units and 54 mole % of $SiO_2$ units, 0.5 parts by mass of tetramethyltetravinylcyclotetrasiloxane, 0.25 parts by mass of a dimethyl polysiloxane solution containing 1 mass % of a chloroplatinic acid/1,3-divinyltetramethyldisiloxane complex as the platinum atom content and 10 parts by mass of a dimethylsiloxane/methyl hydrogen siloxane copolymer having trimethyl siloxy groups occupied on the both ends of the molecular chain and silicon-bonded hydrogen atoms on the molecular side chains (the content of the silicon-bonded hydrogen atoms=0.53 mass %). The composition B was cured at 150° C. for 30 minutes. The cured composition had a hardness of 45 (Type-A 45).

<Preparation of Composition C>

The composition C was prepared by mixing 60 parts by mass of dimethyl polysiloxane having vinyl dimethyl siloxy groups occupied on the both ends of the molecular chain and a viscosity at 25° C. of about 5,000 mPa·s, 15 parts by mass of dimethyl polysiloxane having vinyl dimethyl siloxy groups occupied on the both ends of the molecular chain and a viscosity at 25° C. of about 1,000 mPa·s, 25 parts by mass of an organo polysilozane resin having 39.5 mole % of $(CH_3)_3SiO_{1/2}$ units, 6.5 mole % of $(CH_3)_2(CH_2=CH)SiO_{1/2}$ units and 54 mole % of $SiO_2$ units, 0.5 parts by mass of a 2-(2-butoxyethoxy)acetate solution containing 0.4 mass % of a bis-(2,4-pentanedionato)platinum complex as the platinum atom content and 10 parts by mass of a dimethylsiloxane/methyl hydrogen siloxane copolymer having trimethyl siloxy groups occupied on the both ends of the molecular chain and silicon-bonded hydrogen atoms on the molecular side chains (the content of the silicon-bonded hydrogen atoms=0.53 mass %). The composition C was cured by irradiating with energy of 5000 mJ/cm$^2$ using an ultraviolet radiation device. The cured composition had a hardness of 45 (Type-A 45).

<Molding of Silicone Contact Lens Base Material>

Compositions A and B: The compositions were poured into polypropylene male and female contact lens molds and subjected to a thermal molding process (150° C./30 minutes) to provide a silicone contact lens base material having a diameter of 11 mm and a thickness of 100 μm.

Composition C: The composition was poured into a polypropylene male and female contact lens mold and irradiated with energy of 5000 mJ/cm$^2$ to provide a silicone contact lens base material having a diameter of 11 mm and a thickness of 100 μm.

<Methane Plasma Treatment>

A "plasma polymerization device" manufactured by Shinko Seiki Co. Ltd. was used for the methane plasma treatment. The silicone contact lens base material to be subjected to the plasma treatment was arranged on the contact lens treatment base, and placed inside a bell jar (a reaction vessel: 105 L) which was evacuated to about 0.1 Pa and kept for about 10 minutes. Then, a reactive gas (a mixed gas of methane and oxygen: methane 2 to oxygen 1 by volume) was continuously poured and evacuated by a vacuum pump until the predetermined pressure was achieved.

[Measurement Methods]

Various measurements in the present examples were made in accordance with the following methods.

(1) Oxygen Permeability Coefficient

The oxygen permeability coefficient of a contact lens sample was measured in water at 35° C. by using an IPI type film oxygen permeability meter manufactured by Rika Seiki Industries Co. Ltd. In addition, the thickness of the sample was adjusted by superposing a plurality of the samples, if needed.

(2) Bacteria Attachment Test to Contact Lens

The tendency of *Pseudomonas aeruginosa* (ATCC 9027) (bacteria) attached to the contact lens was evaluated as follows.

The lens was immersed into 5 mL of a sterilized saline per one lens overnight (the pre-treatment of the lens). One milliliter of each test solution was poured into a 24-well multiplate and each of the pre-treated lenses was placed into each well of the multiplate. A saline was used as control, instead of the test solution (n=5). Twenty four hours later, the water on each lens was absorbed into a nonwoven fabric and thereafter each lens was placed a 6-well multiplate into which 103 CFU/ml of a *Pseudomonas aeruginosa* bacteria solution (suspended with saline) was poured and stored at room temperature for 30 minutes. Then, each lens was picked up with a tweezers and placed into a 6-well multiplate into which 5 mL of saline was poured and shook for 1 minute. Each lens was transferred to a centrifuge tube having 5 mL of a new saline and subjected to ultrasound (38 kHz) for 3 minutes, and thereafter stirred with a test tube mixer for 1 minute to release the bacteria attached to each contact lens and recover the attached bacteria solution.

The resulting attached bacteria solution was diluted to a concentration suitable for the measurements, planted on a soybean-casein-digest-agar culture (SCDL agar culture), and cultivated at 33° C. overnight. Then, the observed number of colonies was counted to determine the number of the attached bacteria (live bacteria) for each lens which was then corrected based on the diluted rate. A bacteria attachment controlling percentage (%) for the number of the attached bacteria when using the test solution of Comparative Example 1 was calculated according to the following formula.

The bacteria attachment controlling percentage (%)=[1−(the number of the attached bacterial in each test solution/the number of the attached bacteria in Comparative Example 1)]×100

(3) Contact Angle to Water

A contact angle to a pure water was measured at a temperature of 23° C. and a relative humidity (RH) of 55% with a contact angle meter CA-V manufactured by Kyowa Interface Science Co. Ltd.

(4) Dyeing Test with Oil Red O

To 100 ml of isopropyl alcohol, 0.5 g of Oil Red O was added to prepare a saturated solution. The saturated solution was added with the same amount of distilled water, mixed, and thereafter left for 10 minutes, and filtered. The resulting filtrate was called an Oil Red O dyeing solution. The dyeing test was conducted by immersing a sample piece into the dyeing solution, taking out the sample piece and removing the remaining dyeing solution from the sample piece.

EXAMPLE 1

After a silicone contact lens base material was prepared by using the composition A, an amorphous carbon layer was formed on its surface by the methane plasma treatment to manufacture a silicone contact lens. Table 1 shows the oxygen permeability coefficient and the bacteria attachment test result of the contact lens, and Table 2 shows the contact angle and the dyeing test result of the contact lens.

EXAMPLE 2

After a silicone contact lens base material was prepared by using the composition B, an amorphous carbon layer was formed on its surface by the methane plasma treatment to manufacture a silicone contact lens. Table 1 shows the oxygen permeability coefficient and the bacteria attachment test result of the contact lens, and Table 2 shows the contact angle and the dyeing test result of the contact lens.

EXAMPLE 3

After a silicone contact lens base material was prepared by using the composition C, an amorphous carbon layer was formed on its surface by the methane plasma treatment to manufacture a silicone contact lens. Table 1 shows the oxygen permeability coefficient and the bacteria attachment test result of the contact lens, and Table 2 shows the contact angle and the dyeing test result of the contact lens.

COMPARATIVE EXAMPLE 1

Table 1 shows the oxygen permeability coefficient and the bacteria attachment test result of the contact lens base material molded by using the composition A, and Table 2 shows the contact angle and the dyeing test result of the contact lens base material.

COMPARATIVE EXAMPLE 2

The surface of a silicone contact lens base material molded by using the composition A was modified by the plasma polymerization of oxygen only without using a methane gas. Table 1 shows the oxygen permeability coefficient and the bacteria attachment test result of the resulting contact lens, and Table 2 shows the contact angle and the dyeing test result of the resulting contact lens.

TABLE 1

|  | Example 1 | Example 2 | Example 3 | Comparative Example 1 | Comparative Example 2 |
|---|---|---|---|---|---|
| Oxygen permeability: P (cc(STP)cm/cm$^2$ · sec · cmHg) | $2.36 \times 10^{-8}$ | $2.25 \times 10^{-8}$ | $2.28 \times 10^{-8}$ | $3.81 \times 10^{-8}$ | $3.92 \times 10^{-8}$ |
| Bacteria attachment controlling percentage (%) | 96 | 95 | 92 | Standard (0) | −5 |

TABLE 1-continued

| | Example 1 | Example 2 | Example 3 | Comparative Example 1 | Comparative Example 2 |
|---|---|---|---|---|---|
| Contact angle (°) | 32 | 33 | 30 | 110 | 25 |
| Dyeing test | Not dyed | Not dyed | Not dyed | Dyed | Dyed |

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A silicone contact lens comprising a silicone contact lens base material and an amorphous carbon film formed on the silicone contact lens base material,
wherein the silicone contact lens base material comprises dimethyl polysiloxane, an organo polysiloxane resin, and tetramethyltetravinylcyclotetrasiloxane.

2. The silicone contact lens according to claim 1, wherein the amorphous carbon film is formed by subjecting the silicone contact lens base material to a plasma polymerization under an atmosphere of a mixed gas comprising a hydrocarbon gas and an oxygen-containing gas.

3. The silicone contact lens according to claim 2, wherein the hydrocarbon gas is a methane gas.

4. The silicone contact lens according to claim 2, wherein the mixed gas further comprises an inert gas.

5. The silicone contact lens according to claim 1, wherein the silicone contact lens base material comprises an addition hardened-type silicone rubber.

6. The silicone contact lens according to claim 1, wherein the silicone contact lens base material comprises a peroxide hardened-type silicone rubber.

7. The silicone contact lens according to claim 1, wherein the amorphous carbon film has a thickness of 90 to 250 Å.

8. The silicone contact lens according to claim 1, wherein the amorphous carbon film has a thickness of 100 to 200 Å.

9. A method for manufacturing a silicone contact lens comprising a silicone contact lens base material and an amorphous carbon film formed on the silicone contact lens base material, the method comprising a step of forming the amorphous carbon film by subjecting the silicone contact lens base material to a plasma polymerization under an atmosphere of a mixed gas comprising a hydrocarbon gas and an oxygen-containing gas,
wherein the silicone contact lens base material comprises dimethyl polysiloxane, an organo polysiloxane resin, and tetramethyltetravinylcyclotetrasiloxane.

10. The method according to claim 9, wherein the hydrocarbon gas is a methane gas.

11. The method according to claim 9, wherein the oxygen-containing gas is air or oxygen.

12. The method according to claim 9, wherein the mixed gas further comprises an inert gas.

13. The method according to claim 9, wherein the hydrocarbon gas is a methane gas and the oxygen-containing gas is oxygen.

14. The method according to claim 13, wherein a volume ratio of the methane gas to oxygen is from 50:50 to 70:30.

15. The method according to claim 13, wherein a volume ratio of the methane gas to oxygen is from 55:45 to 65:35.

16. The method according to claim 9, wherein a pressure of the mixed gas is 3 to 10 Pa.

17. The method according to claim 9, wherein the mixed gas is a dry mixed gas.

18. The method according to claim 9, wherein the hydrocarbon gas has no double bond.

* * * * *